United States Patent Office

3,657,272
Patented Apr. 18, 1972

3,657,272
PROCESS FOR PREPARING X-FORM METAL-FREE PHTHALOCYANINE
Paul J. Brach, Rochester, and Hugh A. Six, Webster, N.Y., assignor to Xerox Corporation, Stamford, Conn.
No Drawing. Continuation-in-part of application Ser. No. 755,441, Aug. 6, 1968. This application Dec. 21, 1970, Ser. No. 100,552
Int. Cl. C09b 47/04
U.S. Cl. 260—314.5     12 Claims

ABSTRACT OF THE DISCLOSURE

A process of preparing X-form metal-free phthalocyanine comprising the steps of mixing phthalonitrile in an ammonia-saturated alkylalkanolamine solvent, seeding the mixture with a catalytic amount of X-form phthalocyanine, heating said mixture to reflux temperature and maintaining said temperature for about 20 to about 70 minutes, and filtering the hot reaction product formed thereby is disclosed.

BACKGROUND OF THE INVENTION

This application is a continuation-in-part of parent application, Ser. No. 755,441, filed Aug. 6, 1968 in the United States Patent Office, now abandoned.

This invention relates to phthalocyanine photoconductive materials, and more particularly, to a novel process for the preparation of X-form metal-free phthalocyanine.

It is known that images may be formed and developed on the surface of certain photoconductive materials by electrostatic means. The basic xerographic process, as taught by Carlson in U.S. Pat. 2,297,691, involves uniformly charging a photoconductive insulating layer and then exposing the layer to a light-and-shadow image which dissipates charge on the portions of the layer which are exposed to light. The electrostatic image formed on the layer corresponds to the configuration of the light-and-shadow image. This image is rendered visible by depositing on the imaged layer a finely divided developing material comprising a colorant called a toner and a toner carrier. The powder developing carrier will normally be attracted to those portions of the layer which retain a charge, thereby forming a powder image corresponding to the latent electrostatic image. This powder image may then be transferred to paper and other receiving surfaces. The paper then will bear the powder image which may subsequently be made permanent by heating or other suitable fixing means. The above general process is also described in U.S. Pats. 2,357,809; 2,891,011 and 3,079,342.

It has recently been found that an especially sensitive electrophotographic plate may be prepared by mixing metal-free phthalocyanine in a binder, coating the mixture onto a conductive substrate and hardening the binder. Electrophotographic plates comprising phthalocyanines in a binder are described in detail in copending application Ser. No. 518,450, filed Jan. 3, 1966. It was found that an especially sensitive form of metal-free phthalocyanine could be prepared by extended dry milling or grinding of alpha or beta form metal-free phthalocyanine. This highly sensitive material was found to be a new polymorphic form of phthalocyanine. This new polymorph, now referred to as "X-form" phthalocyanine is described in detail and claimed in U.S. Pat. 3,357,989. While the X-form phthalocyanine produced by grinding or milling has excellent physical properties, this method of preparation has several disadvantages. In order to get complete conversion from alpha or beta phthalocyanine to X-form phthalocyanine often requires very extended periods of milling, often over 100 hours. Besides being time consuming, this process consumes a large amount of power and requires large and sometimes complex milling equipment. Also, impurities may be introduced into the phthalocyanine dispersion from the metallic or ceramic milling equipment. It is very difficult to predict the milling time or total work required in a particular milling machine to insure complete conversion to X-form phthalocyanine. When changes are made in milling equipment or techniques, test runs must be made with frequent sampling and X-ray or infrared examination to detect when complete conversion has been attained.

In copending application Ser. No. 566,839, a second method for the preparation of X-form phthalocyanine is disclosed and claimed. This method comprises mixing the alpha crystalline form of metal-free phthalocyanine with a portion of the X-form and an aliphatic organic solvent, and maintaining the mixture until the alpha form is converted to the X-form. While the X-form phthalocyanine produced by this method, like the X-form material produced by grinding or milling, has excellent physical properties, there is also several disadvantages associated with said method. In order to obtain complete conversion of alpha to X-form, a time period of at least 16 hours is required. Further, one must employ, as a reactant, the alpha form of metal-free phthalocyanine rather than a starting material from which said alpha form is obtained. The synthesis thus becomes a two-step process: (1) conversion of a starting material to alpha metal-free phthalocyanine, and (2) conversion of the alpha to the X-form phthalocyanine. Moreover, in the preparation of alpha metal-free phthalocyanine for further conversion to the X-form, many difficulties have been encountered. The use of metal-free phthalocyanine in xerographic applications places stringent requirements on the purity of this material. It is required that the phthalocyanine intended for use in a xerographic plate generally be free of impurities or contaminates which in one way or another interfere with the xerographic system, whether it be in the charge acceptance or charge dissipation step or other steps in the electrographic system. Until now, phthalocyanine has been prepared almost exclusively for use as a pigment, where color, tinctorial strength, light fastness, dispersibility, etc., are prime considerations and purity is incidental. As a result, reported methods of synthesis (see "Phthalocyanine Compounds" by Moser and Thomas, Rheinhold Publishing Company, pages 104–189) often introduce metals or other complex organic materials as impurities which are difficult to remove. Two general methods have been used for the manufacture of phthalocyanine: (1) indirectly from an acid and a metal phthalocyanine containing a replaceable metal and (2) directly from phthalonitrile.

Methods that include forming a metal phthalocyanine with a replaceable metal which is subsequently removed with an acid are heating phthalonitrile with a sodium alcoholate (U.S. Patent 2,116,602), heating phthalonitrile with sodium cyanamide (U.S. Pat. 2,154,912), heating phthalonitrile with sodium cyanamide and a solvent (U.S. Pat. 2,182,763), heating phthalonitrile with calcium metal in an alcohol or with calcium or barium oxides (U.S. Pat. 2,202,632), heating phthalonitrile with calcium oxide and methylglucamine (U.S. Pat. 2,412,191), heating phthalonitrile with alcohol and sodium hydride (German Pat. 933,047), heating phthalonitrile with magnesium and a solvent under pressure (British Pat. 466,042. Tin phthalocyanine may be prepared by an urea-phthalic anhydride solvent process, but without ammonium chloride (U.S. Pat. 2,197,459).

The above-mentioned methods of synthesis generally introduce metals which are difficult to remove. Methods of removing metal from labile phthalocyanines include: placing a solution of metal phthalocyanine in concentrated sulfuric acid, followed by drowning in water (U.S. Pat. 2,197,459), boiling an alkali or alkali earth metal phthalocyanine with hydrochloric acid (U.S. Pat. 2,216,761), or stirring an alkali metal phthalocyanine with cold methyl alcohol, diluting with warm water, and filtering (U.S. Pat. 2,214,454). Heating an alkali metal phthalocyanine with the ammonium salt of a strong acid converts it to beta metal-free phthalocyanine (U.S. Pat. 2,686,184).

One general method of preparing phthalocyanine which may avoid substantial metallic contaminants is to heat phthalonitrile to 350°–360° C. for 7 hours in a sealed vessel (U.S. Pat. 2,116,602). A second method of synthesis which may avoid substantial metallic contaminants is to heat phthalonitrile in dimethylaniline or in quinoline solution while passing gaseous ammonia through the solution; temperatures are maintained in the vicinity of 250° C. (U.S. Pat. 2,116,602). A third method of synthesis which may avoid substantial metallic contaminants is to heat phthalonitrile with acetamide and/or formamide to the boil for 8 hours (U.S. Pat. 2,182,763). A fourth method is to heat phthalonitrile with dihydroxybenzene, glycol, or glycerin (British Pat. 466,042). A fifth method consists of heating phthalonitrile in an inert solvent in the presence of cyclohexylamine or piperidine (U.S. Pat. 2,485,167). A sixth method is to heat phthalonitrile in a solvent with potassium carbonate, piperidine, and ethylene glycol (U.S. Pat. 2,485,167). Finally, a seventh method of synthesis of phthalocyanine which may avoid substantial metallic contaminants is to add a catalytic amount of triethanolamine to molten phthalonitrile at temperatures of 170° to 180° C. (U.S. Pat. 2,155,054).

While the above seven methods of phthalocyanine synthesis avoid the introduction of metallic impurities, side reactions occur with a resulting lower yield of pigment due to the high temperatures at which these methods of synthesis are carried out. In addition, complex organic impurities are introduced. These organic impurities are difficult to remove and cannot be tolerated in the phthalocyanine compound when it is to be used for xerographic purposes.

Beta phthalocyanine may be converted to the alpha form by dissolving it in 98% sulfuric acid solution and precipitating the solution in ice water. However, sulfuric acid tends to dgerade phthalocyanine resulting in the formation of phthalimide, phthalic acid, and various nitrogen containing compounds which are intolerable in a xerographic system. Furthermore, since it is difficult to extract the sulfuric acid from the reprecipitated phthalocyanine, it is probable that there is a continuous degradation of the phthalocyanine due to residual acid.

In copending application Ser. No. 632,569 there is described a process for the preparation of alpha metal-free phthalocyanine which comprises mixing under certain reaction conditions a labile metal phthalocyanine and carbon dioxide. While this process is capable of producing a pure alpha metal-free phthalocyanine, it involves a period of several hours and numerous steps.

Conventional methods of preparing alpha metal-free phthalocyanine for paint, plastic and ink application (see "Phthalocyanine Compounds" by F. Moser and A. Thomas, Reinhold Publishing Company, pages 104–191) have proved to be relatively expensive. In addition, it has been shown that considerable difficulty is encountered when attempting to isolate and purify the resulting product.

Since large quantities of X-form metal-free phthalocyanine of high purity may be needed for electrophotographic or other uses, there is a continuing need for a simpler, cheaper, less time consuming, and more reproducible method of producing same.

SUMMARY OF THE INVENTION

It is, therefore, an object of this invention to provide a method for preparing X-form metal-free phthalocyanine devoid of the above-noted disadvantages.

It is another object of this invention to provide a one-step direct method for the preparation of X-form metal-free phthalocyanine.

It is still another object of this invention to provide a simple and rapid method of preparing X-form metal-free phthalocyanine.

It is yet another object of this invention to provide a more reliable and dependable method of preparing X-form metal-free phthalocyanine.

It is still another further object of this invention to provide an economical method of preparing X-form metal-free phthalocyanine.

The foregoing objectives and others are accomplished in accordance with this invention, generally speaking, by providing a novel system for the preparation of X-form metal-free phthalocyanine which comprises mixing, at a suitable reaction temperature, phthalonitrile in an ammonia-saturated solvent or 1,3-diaminoisoindoline in a non-ammonia saturated solvent, heating the mixture to about reflux temperature, and seeding the mixture with a catalytic amount of X-form metal-free phthalocyanine which aids in initiating the reaction.

Any suitable solvent may be used in this system. Typical solvents are alkylalkanolamines such as 2-dimethylaminoethanol,
1-dimethylamino-2-propanol,
1-diethylamino-2-propanol,
2-dimethylamino-2-methyl-1-propanol,
2-diethylaminoethanol,
3-dimethylamino-1-propanol,
2-(di-iso-propylamino) ethanol,
2-butylamino-ethanol,
2-dibutylaminoethanol,
2-dibutylaminoethanol,
2[(2-(diethylamino)ethyl)amino] ethanol,
2,2'-(butylimino)diethanol,
2-ethylaminoethanol,
2,2-(ethylimino)diethanol,
2-methyl-amino-ethanol,
2,2'-(methylimino)diethanol,
2-(iso-propylamino) ethanol,
2,2'-(iso-propylimino) diethanol,
2,2'-(tert.-butylimino) diethanol, and
3-diethylamino-1-propanol, among others. Although any suitable solvent may be used in this system, it is preferred that solvents containing a primary alcohol group be employed in order to obtain a higher yield of the final desired product. While any suitable solvent containing a primary alcohol group may be used in this invention, significantly high yields of X-form metal-free phthalocyanine are obtained with the use of 2-dimethylaminoethanol and, accordingly, this particular solvent is most preferred.

Although the synthesis of the present invention may be carried out at any suitable temperature, the range of about 120° C. to about 280° C. has been found convenient. While any appropriate temperature may be employed, it is preferred that a temperature generally in the range of about 135° C. to about 150° C. be used in order to obtain higher yields of the desired final product.

The catalytic amount of X-phthalocyanine employed in this synthesis may be prepared by any of the methods mentioned above, i.e. milling of the alpha form or seed-solvent conversion of the alpha form, or said X-phthalocyanine may consist of a small portion of the X-phthalocyanine which was previously synthesized using the method of preparation of the instant invention.

While any suitable amount of catalyst sufficient to initiate or accelerate the reaction of the present invention may be employed, i.e. a catalytic amount, as a practical matter less than 1% by weight of the reaction mixture, may be employed.

The total reaction time of the instant invention is about 10 to about 70 minutes depending on the particular solvent and temperature employed. If the reaction proceeds much past about 70 minutes reaction time, beta phthalocyanine formation begins to take place and mixtures and X-form and beta-form phthalocyanines are obtained. A preferred reaction time is about 30 to about 55 minutes with 2-dimethylaminoethanol in order to obtain a high yield of pure X-form metal-free phthalocyanine.

Any suitable mixing process may be used to slurry the phthalonitrile in the solvent mix. A complete conversion from phthalonitrile is attained where the mixture is stirred during the conversion period and ammonia gas is bubbled through said mixture. The addition of ammonia gas is not necessary where 1,3-diiminoisoindoline is used. The mixing may be carried out by milling with glass or steel balls, or merely by stirring with a magnetic bar or simple rotating agitator. While the phthalonitrile or 1,3-diimino-isoindoline may be dissolved in the solvent at any suitable temperature, it is preferable to dissolve these materials when said solvent is heated to about 120° C.

After the phthalonitrile or 1,3-diimino-isoindoline is added to the solvent, the mixture is heated to reflux. At this time a catalytic amount of X-form metal-free phthalocyanine is added and the mixture is heated for about 10–70 minutes, depending on the solvent used. The mixture is then filtered hot, washed with alcohol and/or acetone and dried.

DESCRIPTION OF THE PREFERRED EMBODIMENTS

The following examples will further define various preferred embodiments of the present invention. Parts and percentages are by weight unless otherwise specified.

The crystal forms of phthalocyanine produced in each of the following examples are analyzed by conventional X-ray and infrared analysis methods. The X-ray and infrared curves produced by the materials prepared in each of the following examples are compared to curves for known alpha, beta and X-form phthalocyanine as described in detail in the above-mentioned U.S. Pat. 3,357,989.

Example I

About 200 ml. of 2-dimethylaminoethanol is placed in a 4-neck, 500 ml. round bottom flask equipped with a mechanical stirrer, reflux condenser, thermometer, and gas inlet tube. A steady stream of ammonia gas is then passed through the solution. The solution is heated to about 120° C., at which temperature about 80 g. of phthalonitrile is added. Heating and stirring is continued until the mixture reaches about 130° C., at which temperature about .005 g. of X-form metal-free phthalocyanine is added. The temperature of the mixture is then raised to reflux (about 135° C.). This temperature is maintained for about 50 minutes while stirring is continued. The mixture is then filtered hot and the residue is thoroughly washed with methanol in order to remove traces of the 2-dimethylaminoethanol and then with acetone to remove any unreacted phthalonitrile. Finally, it is air-dried and subjected to conventional X-ray and infrared analysis. Analysis shows a generation of X-form phthalocyanine—yield about 70%.

Example II

As a control for the conversion process of Example I, the experiment is repeated without seeding the mixture with a catalytic amount of X-form phthalocyanine. X-ray and infrared analysis show that there is no generation of X-form phthalocyanine.

Example III

The experiment of Example I is repeated, except that about 250 ml. of 3-dimethylamino-1-propanol is employed in place of the 2-dimethylaminoethanol, about 100 g. rather than 80 g. of phthalonitrile are used, and heating is maintained for about 30 minutes rather than about 50 minutes prior to filtering. The product produced is analyzed by X-ray and infrared analysis and proves to be X-form phthalocyanine—yield about 25%.

Example IV

As a control for the conversion process of Example III, the experiment is repeated allowing the mixture to be heated for 75 minutes rather than 30 minutes prior to filtering. X-ray and infrared analysis show the product to be a mixture of X-form and beta phthalocyanines.

Example V

The conversion process of Example I is attempted, allowing the mixture to be heated for 90 minutes rather than 50 minutes prior to filtering. X-ray and infrared analysis show complete conversion to beta phthalocyanine.

Example VI

The experiment of Example I is repeated using 1-dimethylamino-2-propanol (boiling point about 126° C.) in place of 2-dimethylaminoethanol (boiling point about 135° C.). The percentage yield of the final product, which is found by X-ray and infrared analysis to be X-form phthalocyanine, is significantly less than the percentage yield in Example I—about 0.1% yield as opposed to about 70%.

Examples VII–IX

As a further control, the experiment of Example I is repeated three successive times. In the first instance, about 300 ml. of picoline, an aromatic amine, about 120 g. of phthalonitrile, and about .002/g. of X-form phthalocyanine are employed; in the second instance, about 250 ml. of N,N,N',N'-tetramethylethyldiamine, about 100 g. of phthalonitrile and about .004 g. of X-form phthalocyanine are used; in the third case, about 100 ml. of 2-ethoxyethanol, about 45 g. of phthalonitrile, and about .005 g. of X-form phthalocyanine are used. Heating at reflux temperature, prior to filtering, is carried on for 45 minutes, 40 minutes, and 35 minutes, respectively. In the first case, the reaction yields about 1% beta phthalocyanine and 99% unreacted phthalonitrile; in the second case, 100% unreacted phthalonitrile; and in the third case, a mixture of tricyanocyaphenine and unreacted phthalonitrile.

Example X

About 25 ml. of 2-dimethylaminoethanol is placed in a 100 ml. flask and heated to about 120° C., at which temperature about 5.0 g. of 1,3-diimino-isoindoline is added. Heating and stirring is continued until the mixture reaches about 130° C., at which temperature about .005 g. of X-form metal-free phthalocyanine is added. The temperature of the mixture is then raised to reflux (about 140° C.). This temperature is maintained for about 40 minutes while stirring is continued. The mixture is then filtered hot, washed with ethanol, acetone, and methanol, and air-dried. The resulting product is subjected to conventional X-ray and infrared analysis. Analysis shows a generation of X-form phthalocyanine—yield about 20%.

Example XI

As a control for the conversion process of Example X, the experiment is repeated without seeding the mixture with X-form metal-free phthalocyanine. X-ray and infrared analysis show that there is no generation of X-form phthalocyanine.

Example XII

As a further control for the process of Example X, the mixture is heated for about 90 minutes rather than 40 minutes prior to filtering. X-ray and infrared analysis indicated a complete conversion to beta-form phthalocyanine.

Example XIII

The experiment of Example X is repeated using 1-dimethylamino-2-propanol in place of 2-dimethylaminoethanol. The percentage yield of the final product, which is found by X-ray and infrared analysis to be X-form metal-free phthalocyanine, is significantly less than the percentage yield in Example X—about 0.1% yield as opposed to about 20%.

Example XIV

Example X is repeated using 2-ethoxyethanol in place of 2-dimethylaminoethanol. No generation of X-form metal-free phthalocyanine takes place.

While specific components of the present system are defined in the working examples above, any of the other typical materials indicated above may be substituted in said working examples if appropriate. In addition, many other variables may be introduced in the present process, such as further purification steps or other reaction components which may in any way affect, enhance, or otherwise improve the present process.

While various specifics are cited in the present application, many modifications and ramifications will occur to those skilled in the art upon a reading of the present disclosure. These are intended to be encompassed within the scope of this invention.

What is claimed is:

1. A methd of preparing X-form metal-free phthalocyanine comprising the steps of:
   (a) mixing phthalonitrile in a pre-heated ammonia-saturated alkylalkanolamine solvent;
   (b) heating the mixture to about reflux temperature;
   (c) seeding said mixture with a sufficient catalytic amount of X-form metal-free phthalocyanine to initiate a reaction;
   (d) maintaining said temperature for about 10 to about 70 minutes; and
   (e) filtering the hot reaction product formed thereby.

2. The method of claim 1 wherein said alkylalkanolamine contains a primary alcohol group.

3. The method of claim 1 wherein said alkylalkanolamine is 2-dimethylaminoethanol.

4. The method of claim 1 wherein said phthalonitrile is mixed with the solvent when said solvent is at a temperature of about 120° C.

5. The method of claim 1 wherein said reflux temperature is maintained for about 30 to about 55 minutes.

6. The method of claim 1 wherein said mixture is stirred until generation of X-form metal-free phthalocyanine is complete.

7. A method of preparing X-form metal-free phthalocyanine comprising the steps of:
   (a) mixing 1,3-diimino-isoindoline in a pre-heated alkylalkanolamine solvent;
   (b) heating the mixture to about reflux temperature;
   (c) seeding said mixture with a catalytic amount of X-form metal-free phthalocyanine;
   (d) maintaining said temperature for about 10 to about 70 minutes; and
   (e) filtering the hot reaction product formed thereby.

8. The method of claim 7 wherein said alkylalkanolamine contains a primary alcohol group.

9. The method of claim 7 wherein said alkylalkanolamine is 2-dimethylaminoethanol.

10. The method of claim 7 wherein said 1,3-diimino-isoindoline is mixed with the solvent when said solvent is at a temperature of about 120° C.

11. The method of claim 7 wherein said reflux temperature is maintained for about 30 to about 55 minutes.

12. The method of claim 7 wherein said mixture is stirred until generation of X-form metal-free phthalocyanine is complete.

References Cited

UNITED STATES PATENTS

Re 27,117   4/1971   Byrne et al. _____ 260—314.5

HENRY R. JILES, Primary Examiner

HARRY I. MOATZ, Assistant Examiner